United States Patent
Wolfgram

[11] 3,892,052
[45] July 1, 1975

[54] BRIGHTNESS CONTOUR PLOTTER

[75] Inventor: Franklin C. Wolfgram, Annandale, Va.

[73] Assignee: The United States of America as represented by the Secretary of the Army, Washington, D.C.

[22] Filed: May 3, 1974

[21] Appl. No.: 466,766

[52] U.S. Cl. .............................. 356/121; 356/203
[51] Int. Cl.² .......................................... G01J 1/42
[58] Field of Search ............. 356/2, 121, 202, 203

[56] References Cited
UNITED STATES PATENTS
2,641,158 6/1953 Sweet................................. 356/203
3,424,534 1/1969 Miller et al. ...................... 356/203

*Primary Examiner*—Ronald L. Wibert
*Assistant Examiner*—Richard A. Rosenberger
*Attorney, Agent, or Firm*—John E. Holford; Nathan Edelberg; Robert P. Gibson

[57] ABSTRACT

A device is described which will provide a magnified plot of the brightness contour for very small light sources such as light emitting diodes.

6 Claims, 3 Drawing Figures

SHEET 1

BRIGHTNESS CONTOUR PLOTTER

The invention described herein may be manufactured, used, and licensed by or for the Government for governmental purposes without the payment to me of any royalty thereon.

BACKGROUND OF THE INVENTION

There are at present a number of light wavelength conversion systems, e.g. infrared to visible image types, which use tiny solid state detectors and similar light emitters to convert each element of an image. Due to design difficulties and the constraints of available manufacturing techniques, the operating characteristics of these devices are not uniform over the surface area of their optically active faces. A device is currently available for mapping the sensitivity contours of the detectors in these systems, but no similar device has been found for the light emitters.

SUMMARY OF THE INVENTION

An object of the present invention is, therefore, to provide such a device for light emitting elements. A further object is to make such a device using a maximum of existing elements from a system which determined sensitivity contours of a detector element.

BRIEF DESCRIPTION OF DRAWINGS

These and other objects of the invention will be best understood with reference to the accompanying drawings, wherein.

Figure 1:
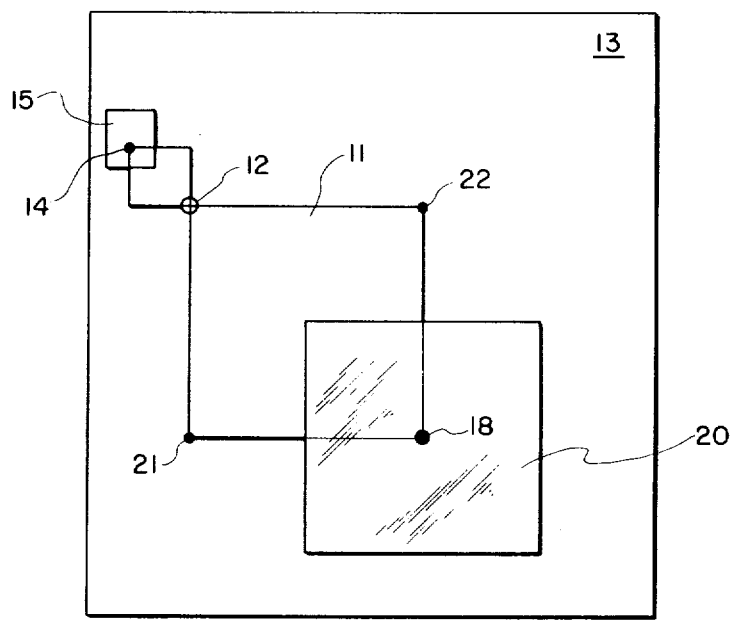
FIG. 1 shows a plan view of the contour plotter according to the present invention lacking details of the detector system.

Referring specifically to FIG. 1 the various elements of the plotter are shown relative to the pantograph 11. The fixed pivot 12 is attached to a suitable platform 13 such as a desk or table and operated by one or more handles not shown attached to the pantograph arms, for example near pivots 21 and 22. A light sampling device (detector) 14 is mounted at the demagnification pivot of the pantograph and a sample light source 15 to be investigated is mounted on platform 13 under it. The information picked up by the sampling device is transmitted to an electronic processing and display unit which will be described in FIG. 2. A position reference light source 18 is mounted on the magnification (large displacement) pivot of the pantograph. A plate 20 of transparent or translucent material is mounted on platform 13 over the position reference light source. The surface of the light source 15 and the plate 20 are mounted as nearly parallel to the plane of the pantograph as practicable. The sampling device and reference light source are preferable simultaneously centered over the sample light source 15 and plate 20, respectively to provide maximum use of plate 20. How this is accomplished will be evident from the next drawing figure.

Figure 2:
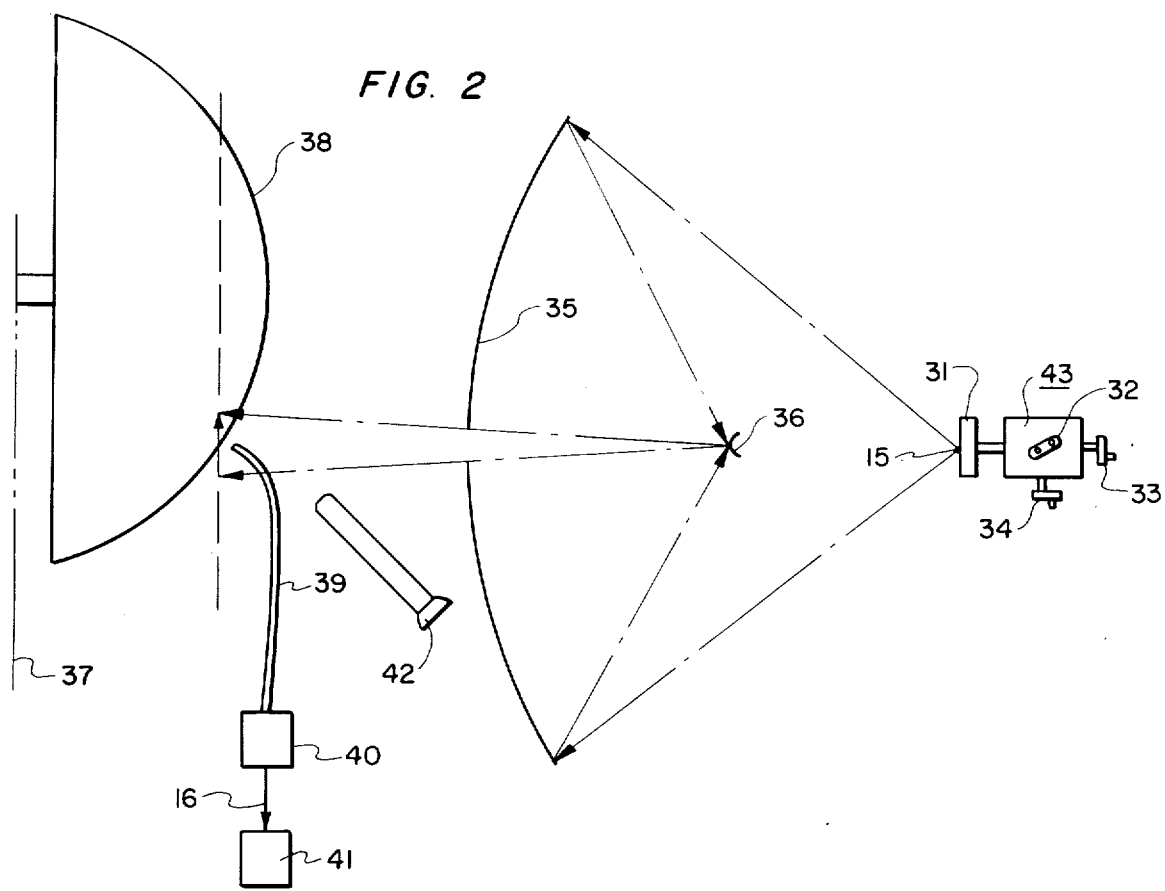
FIG. 2 shows a side view of the small displacement (demagnification) end of the pantograph showing details of the detector system.

FIG. 2 shows the structure of the detecting system most of which is directly mounted on platform 13. The sample source 15 is mounted on a level stage 31 having means 43 to provide $x$, $y$ and $z$ adjustability relative to platform 13 and the detector optics by means of lead screws 32, 33 and 34. The detector optics are preferably a folded system with elements such as reflectors 35 and 36 arranged in Cassegranian or Gregorian relationships. The optical axis of the reflectors is normal to the level surface of the stage. The reflectors are placed far enough below the plane 37 of the pantograph to provide an image area somewhat less than the area of the plate 20 in FIG. 1 when divided by the magnification factor of the pantograph. A convex hemi-spherical reflector 38 much larger than the image mounted under the demagnification pivot of the pantograph with its surface intersecting the plane of the image and facing the stage 31. The input end of a tiny optical fiber 39 having an end area much less than the image area is mounted on the spherical reflector so that its end faces a preselected spot on the above intersection as the two are moved. Since this reflector moves only parallel to the image plane the image is scanned in direct proportion to the distance and direction of travel. A microscope 42 is also trained on reflector 38 to observe the position of the image relative to the above mentioned spot. Assuming that the pantograph is positioned to center pivot 18 over plate 20 (See FIG. 1), the image is centered on the spot preselected and focussed by lead screws 32–34 and a pair of cross-hairs in the microscope. The output end of the fiber 39 is attached to the face of a photomultiplier tube 40 which is in turn connected to a signal processing and display device 41.

Figure 3:
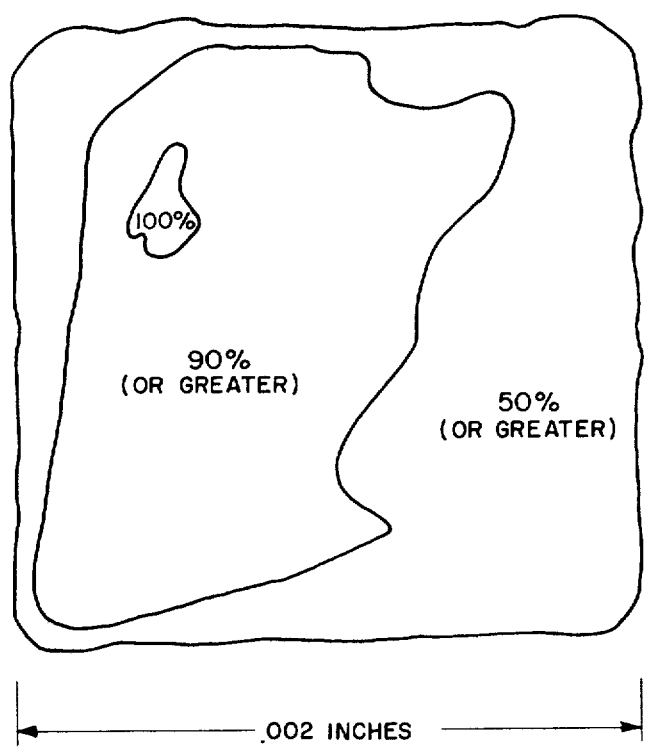
FIG. 3 shows a typical contour plot of a commercially available light emitting diode.

FIG. 3 shows a typical contour plot obtained with the device described above. After centering the sample light source, as described above, a piece of translucent or transparent paper is taped over the plate. The operator then moves the pantograph over the diode until a peak reading is obtained. The display, which may be a simple ammeter with a series resistance is adjusted to give a full scale receding of 100 at this setting. The boundaries of this and other percentage levels can easily be mapped by marking the value indicated over position of the reference light source on the paper attached to plate 20. The magnification factor of the pantograph ranges between 150 and 2,000 times. Power supplies for the sample source and reference source may be included in the display unit or other conventional means. Obviously many variations of above described structures will occur to those skilled in the art but the present invention is limited only as specified in the claims which follow.

I claim:
1. An apparatus for mapping the contours of a sample source with a very small light emitting surface comprising:
   an optical platform;
   mounting means attached to said platform for securing the emitting surface of said sample source in a level position;
   a short focal length high magnification optical lens system mounted on said platform with its optical axis normal to said emitting surface;
   a pantograph mounted on said platform parallel to said emitting surface spaced therefrom a small distance greater than the distance from said platform to the image of said surface formed by said optical system and having demagnification and magnification pivot points;
   a light sampling means attached to said demagnification pivot point to measure the light emitted by a small fractional area of said emitting surface and to display said measurement;

a hemispherical reflector probe attached to said demagnification pivot point facing said emitting surface and intersecting said image thereof;

a light to direct current conversion and direct current display device mounted on said platform; and an optical light conducting fiber interconnecting said probe and said conversion and display device.

2. The apparatus according to claim 1 wherein a translucent plate is mounted adjacent said reference light source on said platform parallel to said pantograph.

3. The apparatus according to claim 1 wherein:
said lens system comprises:
two curved reflectors which form a Cassegranian focal system.

4. The apparatus according to claim 1 wherein said lens system comprises: Gregorian focal system.

5. The apparatus according to claim 1 wherein:
said probe is larger than said image of said emitting surface; and
the end surface area of said optical fiber is much less than the area of such image and is positioned adjacent a preselected point on the intersection between said probe and image.

6. The apparatus according to claim 5 wherein a microscope with a pair of cross-hairs is mounted on said platform and trained on said preselected point.

* * * * *